(12) United States Patent
Hassan, III et al.

(10) Patent No.: US 10,168,136 B2
(45) Date of Patent: Jan. 1, 2019

(54) CLEARANCE GAGE

(71) Applicant: Rolls-Royce Corporation, Indianapolis, IN (US)

(72) Inventors: Daniel James Hassan, III, Noblesville, IN (US); John Patrick Godsil, Avon, IN (US); James Alan Davis, Camby, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 255 days.

(21) Appl. No.: 15/077,640

(22) Filed: Mar. 22, 2016

(65) Prior Publication Data

US 2017/0276467 A1 Sep. 28, 2017

(51) Int. Cl.
| | |
|---|---|
| *G01B 5/14* | (2006.01) |
| *G01M 15/14* | (2006.01) |
| *G01B 5/16* | (2006.01) |
| *G01B 21/16* | (2006.01) |
| *E03C 1/10* | (2006.01) |
| *F16D 21/00* | (2006.01) |
| *G01D 21/00* | (2006.01) |

(52) U.S. Cl.
CPC ............... *G01B 5/14* (2013.01); *G01B 5/16* (2013.01); *G01B 21/16* (2013.01); *G01M 15/14* (2013.01); *E03C 1/102* (2013.01); *F04C 2230/602* (2013.01); *F04C 2270/17* (2013.01); *F16C 2240/40* (2013.01); *F16C 2240/46* (2013.01); *F16D 21/00* (2013.01); *G01D 21/00* (2013.01); *G05B 2219/37405* (2013.01)

(58) Field of Classification Search
CPC ............. G01B 5/14; G05B 2219/37397; G05B 2219/423; E03C 1/102; F04C 2230/602; F04C 2270/17; F16C 2240/40; F16C 2240/46; G01D 21/00
USPC ...... 73/112.01; 33/613, 531, 501.05, 501.06, 33/501.08, 542, 544.4
See application file for complete search history.

(56) References Cited

U.S. PATENT DOCUMENTS

| | | |
|---|---|---|
| 4,577,507 A | 3/1986 | Jestrich et al. |
| 5,119,036 A | 6/1992 | Rickards et al. |
| 5,761,821 A | 6/1998 | Laycock |

(Continued)

OTHER PUBLICATIONS

Bal-Tec—All Ball Gages Information Page, Ball Plug Gages, Precision; Retrieved on Jan. 21, 2016 from http://www.precisionballs.com/all_ball_gages.php, 20 pgs.

*Primary Examiner* — Manish S Shah
*Assistant Examiner* — Timothy Graves
(74) *Attorney, Agent, or Firm* — Shumaker & Sieffert, P.A.

(57) ABSTRACT

A clearance gage that includes an elongated shaft having a first end and a second end, a gage element connected to the first end of the elongated shaft, where the gage element defines a first width and a second width measured perpendicular to the elongated shaft, where the first width is larger than the second width, where a thickness of the elongated shaft is not more than the second width, where the first width defines a size of the gage element to assess a gap clearance between two components, and a marker connected to the elongated shaft, where the marker is positioned at a predetermined distance from the gage element along the elongated shaft, where the marker defines a marker width measured in a direction perpendicular to the elongated shaft that is greater than the second width of the gage element.

19 Claims, 6 Drawing Sheets

(56) References Cited

U.S. PATENT DOCUMENTS

| | | |
|---|---|---|
| 7,920,973 B2 | 4/2011 | Mollmann et al. |
| 8,336,222 B1 | 12/2012 | Kostenick, Jr. et al. |
| 8,973,428 B2 | 3/2015 | Barthelemy et al. |
| 2010/0043576 A1* | 2/2010 | Craig .................... G01B 21/16 73/865.9 |
| 2014/0076037 A1 | 3/2014 | Warren et al. |
| 2015/0075265 A1 | 3/2015 | Memmer et al. |

\* cited by examiner

CLEARANCE GAGE

TECHNICAL FIELD

The present disclosure relates to a gage for measuring the clearance between two components of a gas turbine engine.

BACKGROUND

During the service life of a gas turbine engine, the engine must be serviced and maintained to ensure the engine operates within appropriate parameters. Some of the service and maintenance may require the measurements of component clearances to ensure they are within specifications for same operations. Some of the clearance measurements may indicate the general operation condition of a turbine engine or provide information useful for diagnosing or trouble shooting issues with the engine's operation. In some examples, the gas turbine engine may need to be dismantled or partially dismantled to gain access to the inner recesses of the engine in order to perform the measurements of specific component clearances. Disassembly of a turbine engine can be a costly endeavor that requires several hours to complete, leading to significant downtime of the engine.

SUMMARY

In some examples, the disclosure describes a clearance gage that includes an elongated shaft having a first end and a second end, a gage element connected to the first end of the elongated shaft, where the gage element defines a first width and a second width measured perpendicular to the elongated shaft, where the first width is larger than the second width, where a thickness of the elongated shaft is not more than the second width, where the first width defines a size of the gage element to assess a gap clearance between two components, and a marker connected to the elongated shaft, where the marker is positioned at a predetermined distance from the gage element along the elongated shaft, where the marker defines a marker width measured in a direction perpendicular to the elongated shaft that is greater than the second width of the gage element.

In some examples, the disclosure describes a clearance gage that includes an elongated shaft having a first end and a second end, a gage element connected to the first end of the elongated shaft, where the gage element defines a gage width that corresponds to the size of the gage element to assess a gap clearance between two components, where the gage element is configured to be inserted through a gap smaller than the size of the gage element, and a marker connected to the elongated shaft, where the marker is positioned at a predetermined distance from the gage element along the elongated shaft, where the marker defines a marker width measured in a direction perpendicular to the elongated shaft that is at least equal to the size of the gage element.

In some examples, the disclosure describes a method for assessing a clearance gap between two components of a turbine engine with the gas turbine engine off and without needing to disassemble the gas turbine engine. The method includes inserting a portion of a clearance gage past a constriction point in the gas turbine engine that defines a first gap distance, where the clearance gage includes an elongated shaft having a first end and a second end, a gage element connected to the first end of the elongated shaft, where the gage element defines a first width and a second width measured perpendicular to the elongated shaft, where the first width defines a size of the gage element and is greater than the first gap distance, where the second width is less than the first gap distance to allow the gage element to be inserted past the constriction point. The method may include rotating the clearance gage so that the first width of the gage element aligns with the clearance gap being evaluated and advancing the clearance gage further into the gas turbine engine to determine whether the first width of the gage element can pass through the clearance gap.

The details of one or more examples are set forth in the accompanying drawings and the description below. Other features, objects, and advantages will be apparent from the description and drawings, and from the claims.

DETAILED DESCRIPTION

In general, the disclosure describes a clearance gage that may be used to measure a cold clearance gap between components of a gas turbine engine. In some examples, the clearance gage may be use to assess the cold clearance between components of a gas turbine engine without needing to disassemble the engine. The cold clearance between the components may otherwise be inaccessible to inspection absent disassembly of the engine. Additionally or alternatively, in some examples, the clearance gage may be inserted through a constriction point of engine to measure the gap clearance between components where the constriction point presents a smaller opening than the gap clearance to be measured.

Figure 1:
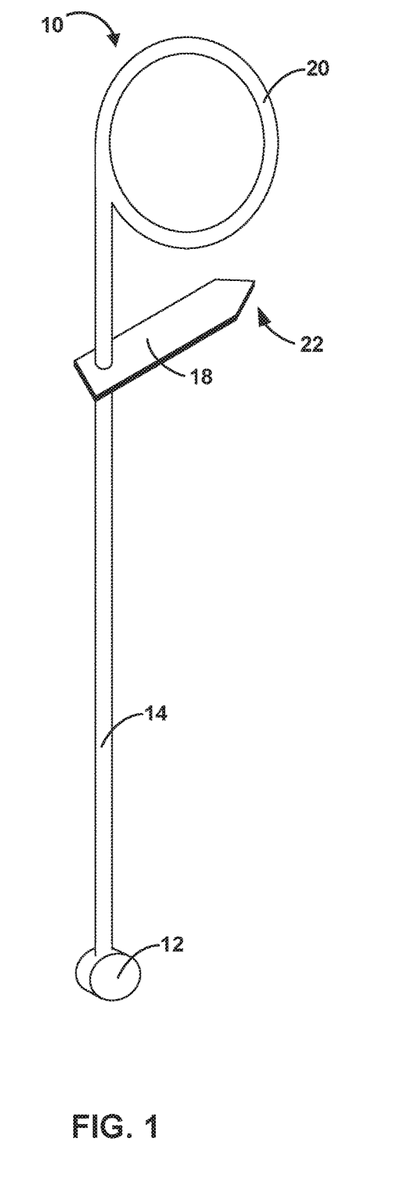
FIG. 1 is a conceptual perspective view of an example clearance gage.
Figure 2:
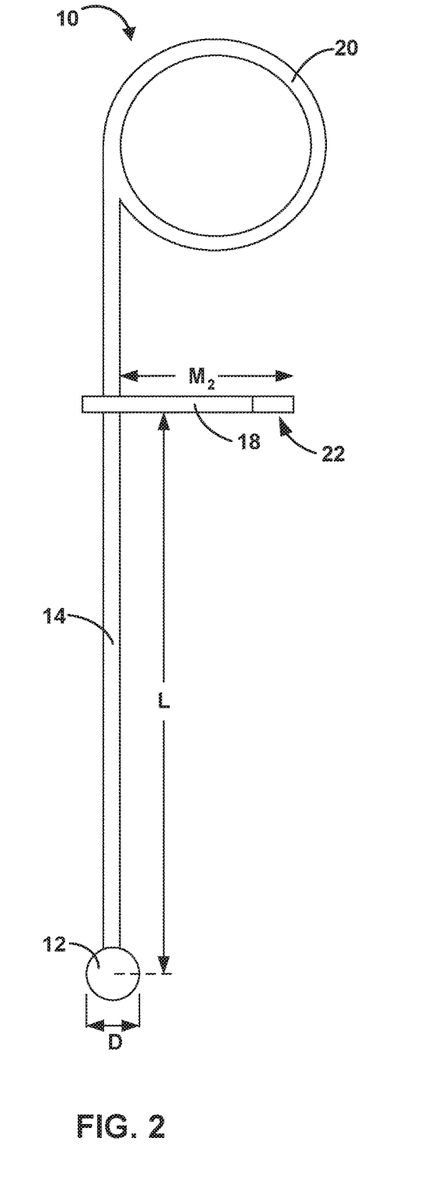
FIG. 2 is a conceptual side view of an example clearance gage.

FIGS. 1 and 2 illustrate an example perspective (FIG. 1) and side (FIG. 2) views of an example clearance gage 10 that includes a gage element 12 connected to an elongated shaft 14. Gage element 12 may be selectively sized to provide a set clearance measurement that may be used to assess the clearance between two components of a turbine engine. In some examples, clearance gage 10 may additionally include a marker 18 and a handle 20.

Elongated shaft 14 may be attached to gage element 12 by any suitable means including, for example, welding, brazing, bonding (e.g., epoxied), mechanically attaching (e.g., pressure fitted, screwed, or bolted), or the like. In some examples, gage element 12 may be removable from elongated shaft 14. For example, clearance gage 10 may be supplied with one or more gage elements 12 to correspond to different size specification. The various gage elements 12 can be interchangeably connected to elongated shaft 14 to determine gap clearances of different sizes. In some examples, gage element 12 and elongated shaft 14 may be formed as a unitary structure (e.g., cast or molded).

Gage element 12 may be formed of any suitable material sufficiently rigid to maintain its shape and provide an accurate assessment of a gap clearance between two components. Suitable materials may include, for example, metals (e.g., hardened steel), hard polymers, composites, or the like.

Elongated shaft 14 may be formed using any suitable material including for example, metals (e.g., AISI 1020 steel), semi-flexible polymers (e.g., glass reinforced nylon, semi-flexible polycarbonate), or the like. In some examples, elongated shaft may be formed from a semi-flexible material so that the shaft can be deflected along its central axis (e.g., along length L of FIG. 2) with an applied force to afford clearance gage 10 greater navigability through inner recesses and around curves of a gas turbine engine. In some such examples, the shaft may retain sufficient rigidity so that the orientation of gage element 12 relative to marker 18 does not significantly change when a rotational torque is applied to the central axis of elongated shaft 14 during the use of clearance gage 10. In some examples, elongated shaft 14 may be formed from a flexible rod or wire defining a cross-sectional thickness less than the thickness of gage element 12 (e.g., less than height (H) as described below).

Optional handle 20 may be of any suitable design that may be held by the user and allow the user to position, maneuver, and retrieve clearance gage 10. For example, handle 20 may be in the form of a finger loop connected to an end of elongated shaft 14 opposite of gage element 12. In some examples, handle 20 may be a separate component attached (e.g., welded) to elongated shaft 14. In other examples, handle 20 may be formed from a portion of elongate shaft 14. For example, elongate shaft 14 may be a flexible wire that includes an end looped around and secured to form a finger loop for handle 20.

In some examples, the design of gage element 12 in conjunction with elongate shaft 14 as described further be may allow clearance gage 10 to assess the gap clearance between components deep within the inner recesses of a gas turbine engine without the need for disassembly of the engine. Additionally the design of gage element 12 may allow for the gage element to be advanced beyond one or more constriction points that would otherwise prohibit access to assess of the gap clearance between components of a gas turbine engine absent disassembly. In some examples, the design of one or more of handle 20 and marker 18 may assist in preventing the unintentional loss of clearance gage 10 by prohibiting the handle 20 or marker 18 from being unintentionally advanced beyond a constriction point such that the clearance gage 10 would no longer be retrievable without disassembly of the gas turbine engine.

Figure 3:
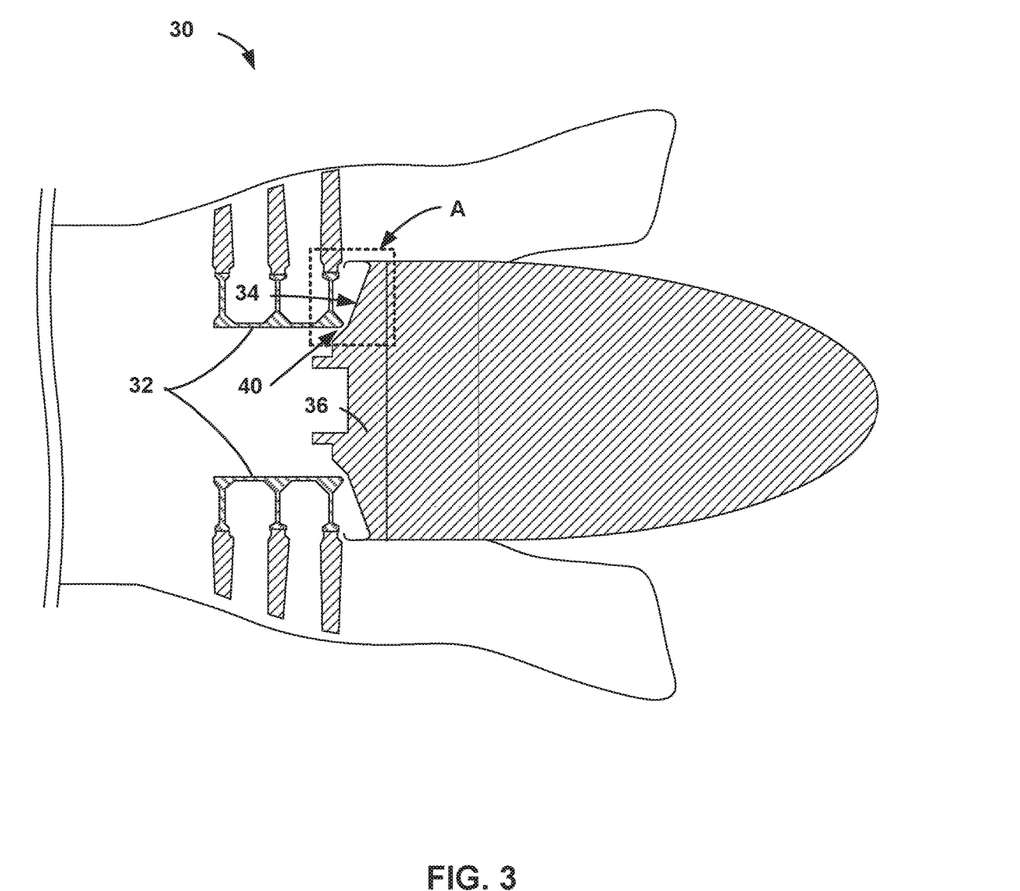
FIG. 3 is a conceptual cross-sectional view of an example gas turbine engine that includes two components that form a clearance gap that can be assessed using the clearance gage of FIG. 1.
Figure 4:
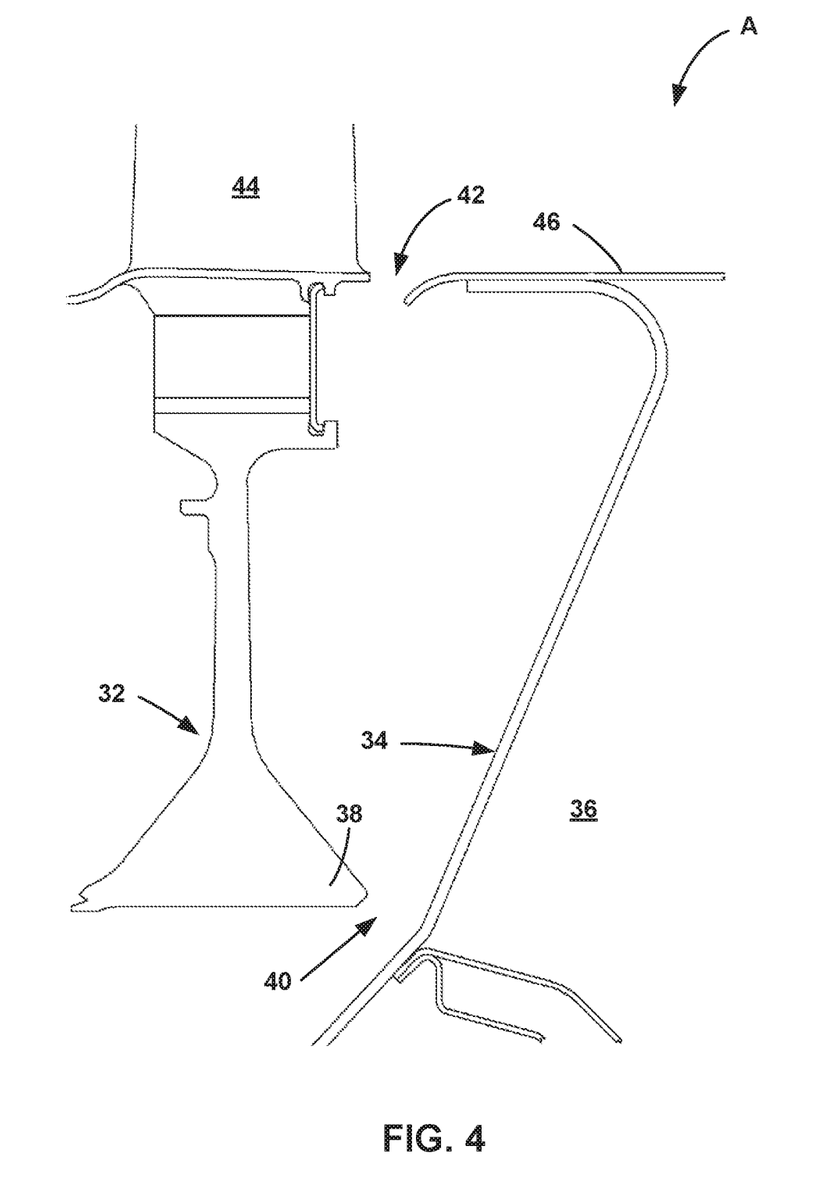
FIG. 4 is an enlargement of area A from FIG. 3 that illustrates the clearance gap between the two components.

FIG. 3 is a conceptual cross-sectional view of an example gas turbine engine 30 that includes two components that form a clearance gap 40 that can be assessed using clearance gage 10. Gas turbine engine 30 may include a low pressure turbine wheel (LPT wheel 32) that includes and turbine blade 44 and inner hub 38, and a rear turbine bearing support (RTBS 36) including a RTBS diaphragm 34. The inner hub 38 of the LPT wheel 32 and RTBS diaphragm 34 are separated by a clearance gap 40 that can be assessed using clearance gage 10. FIG. 4 is an enlargement of area A from FIG. 3 that provides a clearer view of clearance gap 40 between LPT wheel 32 and RTBS diaphragm 34. In some examples, clearance gap 40 between LPT wheel 32 and RTBS diaphragm 34 may be less than the original design intent resulting in a reduced clearance between LPT wheel 32 and RTBS diaphragm 34. The reduced clearance can produce inefficiencies or disturbances in the routine operation of turbine engine 30, for example, due to contact between LPT wheel 32 and RTBS diaphragm 34. In some examples it may be desirable to maintain a minimal clearance gap 40 between LPT wheel 32 and RTBS diaphragm 34 to maintain desired operability.

Due to the location of clearance gap 40 within the inner recesses of gas turbine engine 30, an accurate assessment of clearance gap 40 can be difficult to obtain. For example, physical access to clearance gap 40 may be impeded or otherwise prohibited by one or more constriction points within gas turbine engine 30 while turbine engine 30 is assembled. As shown in FIG. 4, RTBS 36 may include flow surface 46 positioned adjacent turbine blades 44 of LPT wheel 32. The relative proximity of flow surface 46 to turbine blades 44 produces a constriction point 42 that may create a gap smaller than the intended minimal clearance for clearance gap 40. Because constriction point 42 may be smaller than the intended minimal clearance, gage elements or assessment tools sized to determine the relative clearance of clearance gap 40 may be prevented from passing through constriction point 42 and to gain access to clearance gap 40.

In some examples, clearance gap 40 may be measured using conventional tools by first partially disassembling gas turbine engine 30 to gain access to the opposing surfaces of LPT wheel 32 and RTBS 36. Disassembly of turbine engine 30, however, may disturb or otherwise alter the relative position between LPT wheel 32 and RTBS 36, leading to an inaccurate assessment of clearance gap 40. In some examples, LPT wheel 32 and RTBS 36 may need to be physically separated from one another to gain access to the respective opposing surfaces to assess clearance gap 40. Some such examples may require a multi-step, complex analysis to determine the expected size of clearance gap 40 once LPT wheel 32 and RTBS 36 are reassembled. Such analysis may be prone to various computational errors. Further, even partial disassembly of gas turbine engine 30 may be expensive due to the time used to disassemble the engine and determine clearance gap 40.

In some examples, clearance gage 10 may be used to assess clearance gap 40 between LPT wheel 32 and RTBS diaphragm 34 without otherwise disturbing the relative position between LPT wheel 32 and RTBS 36, and with less or substantially no disassembly of gas turbine engine 30. Additionally, clearance gage 10 may be sized to pass through constriction point 42, while still providing an accurate assessment of the relative size of clearance gap 40.

Figure 5:
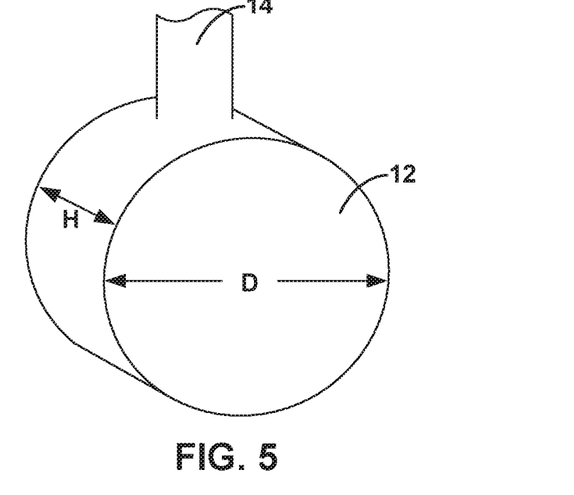
FIG. 5 is a close-up perspective view of an example gage element of the clearance gage from FIG. 1.

For example, gage element 12 may be sized to define a first width (e.g., a major dimensional width) sized to assess clearance gap 40, and a second width (e.g., a minor dimensional width) sized to pass through constriction point 42. FIG. 5 shows a close-up perspective view of an example gage element 12 for clearance gage 10 from FIGS. 1 and 2. In some examples, gage element 12 may be cylindrical shaped (e.g., a cylinder, a bowed cylinder, a sphere with flattened sides, or the like) with the first width (e.g., the major dimensional width) represented by the diameter of the cylindrical shape (D) and corresponding to the size of the gage element (e.g., the gage dimension), and with the second width (e.g., the minor dimensional width) represented by the height of the cylindrical shape (H). In some such examples, having the second width, e.g., the height (H), of gage element 12 smaller than the gage dimension (D) may allow gage element 12 to be inserted through constriction point 42 in turbine engine 30 where the constriction point is smaller than the gage dimension (D) and would otherwise prohibit the passage of gage element 12 through constriction point 42 to gain access to clearance gap 40. Such a construction of gage element 12 may allow a user to measure the gage clearance between two components in a turbine engine that would otherwise require the engine to be at least partially disassembled to gain access to the gap intended to be measured (e.g., clearance gap 40).

While the first and second widths (e.g., D and H respectively) of gage element 12 may be sized to produce any number of desired dimensions, in some examples for measuring clearance gap 40 between LPT 32 and RTBS 36, the first width (e.g., the gage dimension (D)) may be between about 0.22 and about 0.26 inches (e.g., about 5.5 millimeters (mm) and about 6.5 mm). In some examples, the first width is about 0.233 inches (e.g., about 5.92 mm) and the second width is less than about 0.15 inches (e.g., less than about 3.8 mm). In other examples, the first width is about 0.250 inches (e.g., about 6.35 mm) and the second width is less than about 0.15 inches. Similarly, the second width (e.g., the height dimension (H)) may be sized to fit through contraction point 42. In some examples, contraction point 42 may be on the order of about 0.175 inches to about 0.195 inches. Accordingly, in some examples, the second width (e.g., the height dimension (H)) may be at less than about 0.2 inches (e.g., less than about 5 mm), less than about 0.19 inches (e.g., less than about 4.8 mm), or less than about 0.17 inches (e.g., less than about 4.3 mm).

Figure 6:
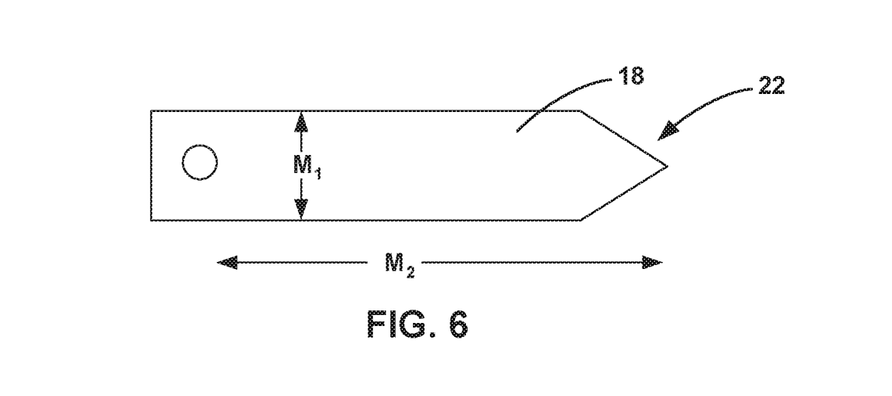
FIG. 6 is a close-up top view of an example marker of the clearance gage from FIG. 1.

FIG. 6 shows a close-up top view of an example marker 18 of clearance gage 10 from FIGS. 1 and 2. In some examples, marker 18 may be sufficiently sized so that marker 18 acts as a stop to prevent clearance gage 10 from being advanced past constriction point 42. Some such examples may prevent clearance gage 10 from being inadvertently lost in the inner recesses of turbine engine 30 and requiring disassembly of turbine engine 30 to retrieve clearance gage 10. In some examples, marker 18 may be in the form of a plane that defines a major surface aligned generally orthogonal (e.g., between about 60 and 90 degrees) to elongated shaft 14. The major surface of marker 18 may include a first and second width dimension (e.g., $M_1$ and $M_2$) that are greater than the height (H) of gage element 12 to prevent marker 18 from advancing past constriction point 42. In some examples, at least one of the first and second width of marker 18 may be greater than the gage dimension (D) of gage element 12.

As shown in FIG. 2, marker 18 may be connected to elongated shaft 18 at a predetermined distance (length (L)) from the center of gage element 12 (e.g., the position of gage element 12 defining the gap dimension (D)). As described further below, the predetermined distance (L) may be selected such that during use, when gage element 12 is advanced past clearance gap 40 indicating that the gap distance is at least the size of the gage dimension (D), marker 18 contacts a portion of gas turbine engine 30 adjacent to constriction point 42, thereby indicating that the gage element 12 has passed the clearance gap 40 and preventing clearance gage 10 from advancing further into turbine engine 30.

Figure 7:
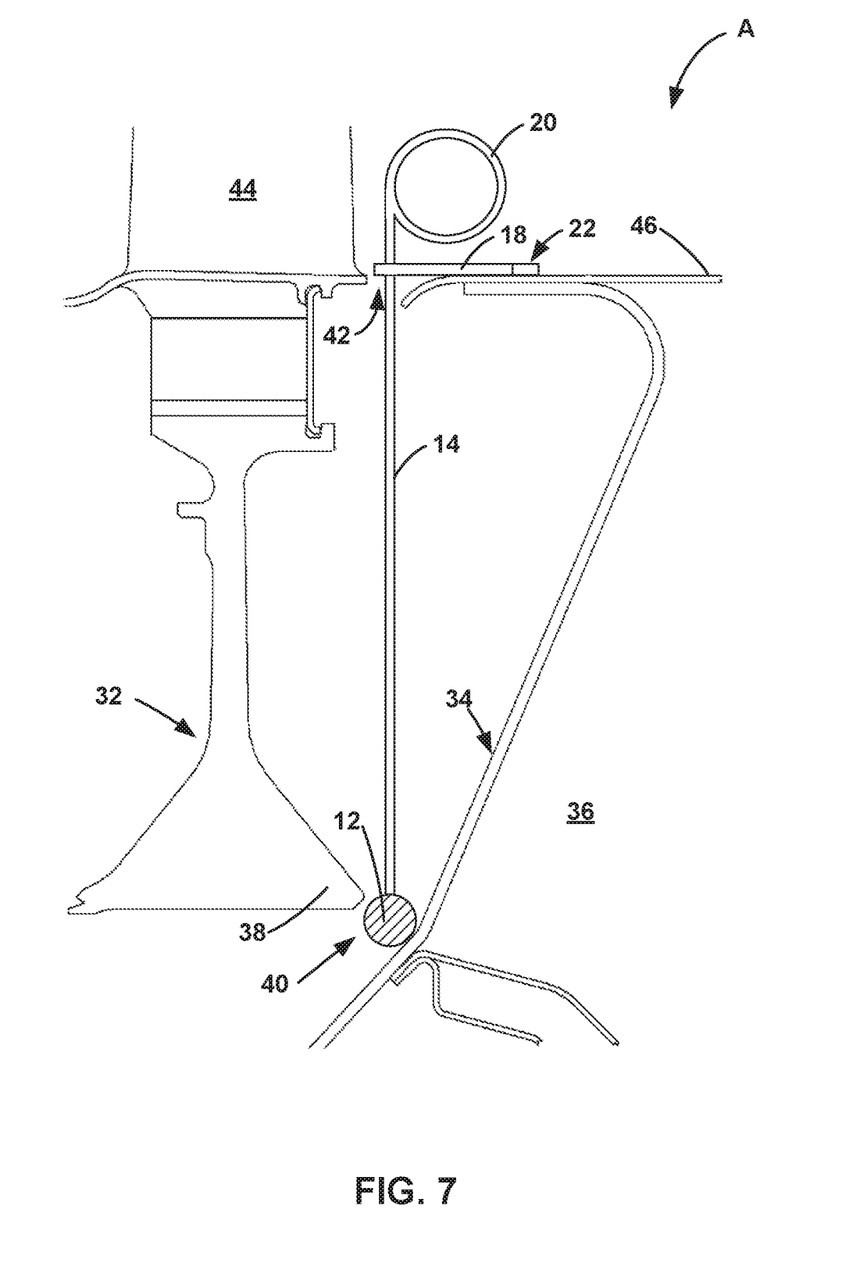
FIG. 7 is an enlargement of area A from FIG. 3 that illustrates the clearance gap between the two components with the clearance gage of FIG. 1 inserted.

For example, FIG. 7 shows the enlargement of area A from FIG. 3 with clearance gage 10 inserted and gage element 12 passing through clearance gap 40. As shown in FIG. 7, marker 18 may come into contact with flow surface 46 of RTBS 36 adjacent to constriction point 42. In some such examples, the distance (L) between marker 18 and the center of gage element 12 may be selected such that when marker 18 contacts flow surface 46 adjacent to clearance gap 42, gage element 12 has passed through gap clearance 40, thereby indicating the minimal clearance between LPT wheel 32 and RTBS diaphragm 34 has been met. Additionally, in some examples in which the minimal clearance between LPT wheel 32 and RTBS diaphragm 34 is not met, e.g., where the gage dimension (D) is greater than clearance gap 40, gage element 12 may be impeded from passing through clearance gap 40 causing marker 18 to set above flow surface 46, thereby providing an indication that the minimal clearance has not been met. In some examples, the predetermined distance (L) may be between about 3 and about 5 inches, or between about 3 and about 4 inches. In some examples, the predetermined distance (L) may be about 3.67 inches.

In some examples, marker 18 may be configured to indicate the orientation of gage element 12 relative to the marker 18 to assist with alignment of gage element 12 with clearance gap 40. For example, maker 18 may include a length characteristic (e.g., $M_2$) that extends outward from elongated shaft 14 so that the length ($M_2$) aligns with one of the first or second widths of gage element 12. As shown in FIG. 2, in some examples, the length ($M_2$) of marker 18 may be aligned substantially parallel (e.g. parallel or nearly parallel) with the gap dimension (D) of gage element 12. Additionally or alternatively, marker 18 may include a pointer 22 that indicates the orientation of gage element 12.

Marker 18 may be formed using any suitable material including for example, metals, plastics, or the like. Marker 18 may be attached to elongated shaft 14 using any suitable technique. For example, marker 18 may be formed as a sheet of metal with an aperture stamped in it about the size of the thickness of elongated shaft 14. Marker 18 may positioned on elongated shaft 14 and bonded (e.g., welded, braised, glued, adhered, or the like) into place at a predetermined distance away from gage element 12. In other examples, marker 18 may be adjustable so that a user can selectively set marker 18's relative position along elongated shaft 14.

Figure 8:
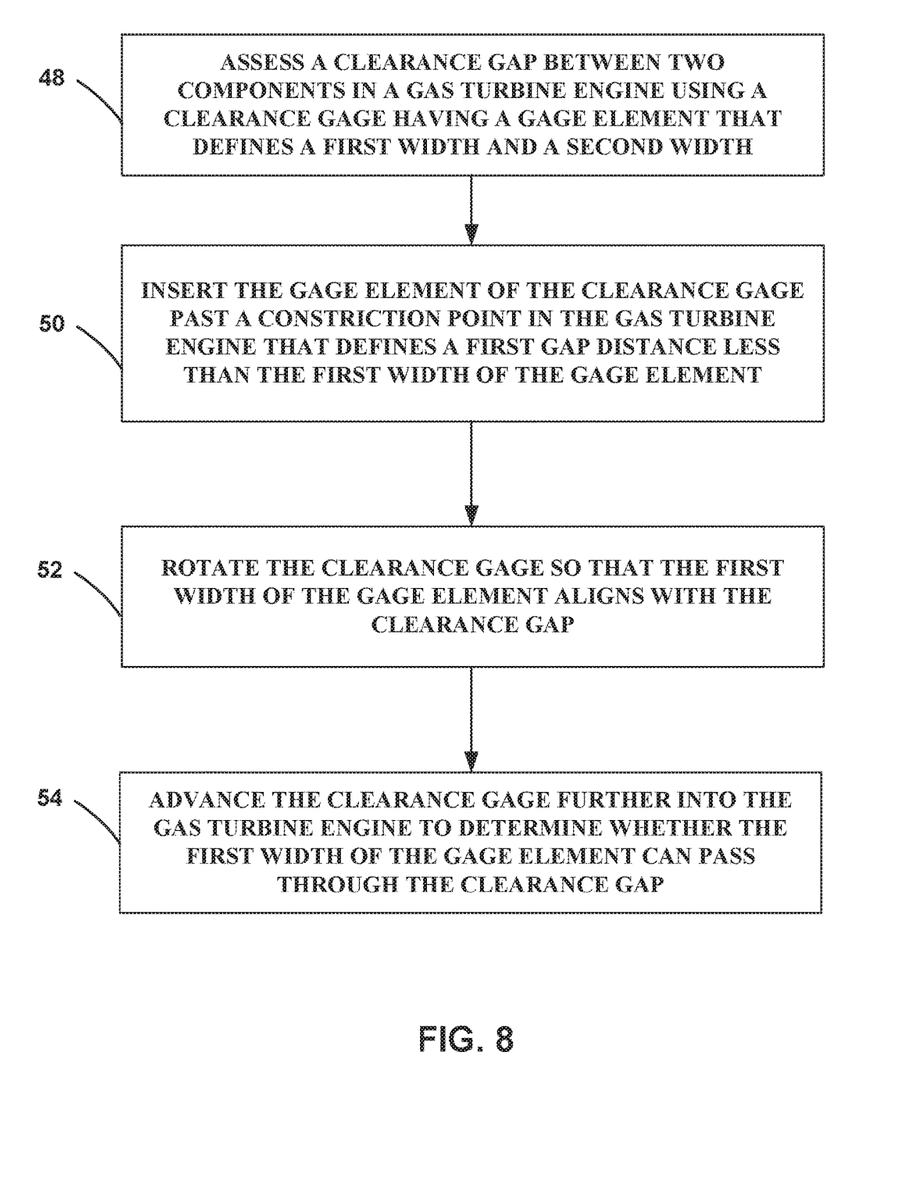
FIG. 8 is a flow diagram illustrating an example technique for assessing the clearance gap between two components of a gas turbine engine.

FIG. 8 is a flow diagram illustrating an example technique for assessing the clearance gap between two components of a gas turbine engine (48) with the gas turbine engine off and without needing to disassemble the gas turbine engine. FIG. 8 is described below in reference to FIG. 7 for illustrative purposes, however, such descriptions are not intended to be limiting and the techniques of FIG. 8 may be used to assess the gap distance between other components or clearance gage 10 of FIG. 7 may use to assess the clearance gap between two components using other techniques.

FIG. 8 illustrates an example technique to assess clearance gap 40 between two components in gas turbine engine 30 using clearance gage 10 having gage element 12 that defines a first width (e.g., gage dimension (D)) and a second width (e.g. height (H)) (48). The technique includes inserting gage element 12 of clearance gage 10 past a constriction point 42 in the gas turbine engine 30 that defines a first gap distance (e.g., the displacement at constriction point 42) that is less than the first width (e.g., gage dimension (D)) of gage element 12 (50). As describe previously, clearance gage 10 may include elongated shaft 14 having a first and second end with gage element 12 connected to the first end. Gage element 12 may define a first width and a second width measured perpendicular to the elongated shaft (e.g., perpendicular to length (L)), where the first width defines a size of the gage element (e.g., gage dimension (D)) and may be greater than the first gap distance at constriction point 42. The second width of gage element 12 (e.g., height (H)) may be less than the first gap distance at constriction point 42 to allow gage element 12 to be inserted past constriction point 42 when the second width of gage element 12 (e.g., height (H)) is aligned with the constriction point 42. In some examples constriction point 42 of gas turbine engine 30 may be formed by the space between (e.g. the first gap distance) flow path surface 46 of RTBS 36 and gas turbine blades 44 of LPT wheel 32. In some examples, the first gap distance may be about 0.15 inches.

The technique of FIG. 8 also includes rotating clearance gage 10 so that the first width of gage element 12 (e.g., gage dimension (D)) aligns with the clearance gap being evaluated (e.g., clearance gap 40) (52). As described above, after inserting gage element 12 past a constriction point 42 of gas turbine engine 30 (50), the clearance gage 10 may be rotated about 90 degrees so that the gap dimension (D) of gage element 12 aligns with clearance gap 40. In some examples, clearance gap 40 may be formed by the separation distance between LPT wheel 32 and RTBS diaphragm 34. In some examples, separation distance between LPT wheel 32 and RTBS diaphragm 34 (e.g., second gap distance) may be about 0.2 inches to about 0.3 inches.

In some examples, clearance gage 10 may include marker 18 that may be configured to indicate the orientation of gage element 12 relative to the marker 18, thereby providing a convenient indicator for the user to determine the orientation of gage element 12 without being able to see gage element 12.

The technique of FIG. 8 may also include advancing clearance gage 10 further into gas turbine engine 30 to determine whether the first width (e.g., gage dimension (D)) of the gage element 12 can pass through clearance gap 40. In some such examples, marker 18 may be positioned at a predetermined distance (L) from gage element 12 along elongated shaft 14 such that if clearance gap 40 is sufficiently large to allow gage element 12 to pass through (e.g., gage dimension (D) is less than clearance gap 40), marker 18 may come into contact with a portion of flow path surface 46 adjacent to constriction point 42, thereby indicating gage element 12 has successfully passed through clearance gap 40. Additionally, if clearance gap 40 is undersized (e.g., gage dimension (D) is greater than clearance gap 40), marker 18 may be prevented form seating against flow path surface 46, thereby providing an indication gage element 12 is unable to pass through clearance gap 40 and that gas turbine engine 30 may require servicing to achieve the desired operational parameters.

Once clearance gap 40 has been assessed, clearance gage 10 may be remove from gas turbine engine 30 by rotating clearance gage about 90 degrees to re-align the second width of clearance gage 10 (e.g., height (H)) with constriction point 42 and withdrawing clearance gage 10 from turbine engine 30. In some examples, the techniques of FIG. 8 may then be repeated to assess the clearance gap 40 between LPT wheel 32 and RTBS diaphragm 34 at different positions around LPT wheel 32 (e.g., about every 45 degrees) to get a relatively full assessment of the clearance between LPT wheel 32 and RTBS diaphragm 34.

Various examples have been described. These and other examples are within the scope of the following claims.

The invention claimed is:

1. A clearance gage comprising:
an elongated shaft having a first end and a second end; wherein the elongated shaft is a flexible material configured to bend along a longitudinal axis of the elongated shaft;
a gage element connected to the first end of the elongated shaft, wherein the gage element defines a first width and a second width measured perpendicular to the elongated shaft, wherein the first width is larger than the second width, wherein a thickness of the elongated shaft is not more than the second width, and wherein the first width defines a size of the gage element to assess a gap clearance between two components;
a marker connected to the elongated shaft, wherein the marker is positioned at a predetermined distance from the gage element along the elongated shaft, wherein the marker defines a marker width measured in a direction perpendicular to the elongated shaft that is greater than the second width of the gage element; and
a handle, separate from the marker, at the second end of the elongated shaft.

2. The clearance gage of claim 1, wherein the gage element defines a cylindrical shape, with the first width corresponding to a diameter of the cylindrical shape and the second width corresponding to a height the cylindrical shape, and wherein the elongated shaft connects with the gage element orthogonal to the height of the cylindrical shape.

3. The clearance gage of claim 1, wherein the first width is about 0.22 to about 0.26 inches and the second width is less than about 0.2 inches.

4. The clearance gage of claim 3, wherein the first width is about 0.233 inches.

5. The clearance gage of claim 3, wherein the marker is positioned about 3 inches to about 4 inches away from a center of the gage element, and wherein the marker is configured to indicate the orientation of the gage element relative to the marker.

6. The clearance gage of claim 1, wherein the elongated shaft is a flexible rod or a flexible wire.

7. The clearance gage of claim 1, wherein the elongated shaft is flexible along an entire length between the first end and the second end.

8. A clearance gage comprising:
an elongated shaft having a first end and a second end, wherein the elongated shaft is a flexible material configured to bend along a longitudinal axis of the elongated shaft;
a gage element connected to the first end of the elongated shaft, wherein the gage element defines a gage width that corresponds to a size of the gage element to assess a gap clearance between two components, and wherein the gage element is configured to be inserted through a gap smaller than the size of the gage element;
a marker connected to the elongated shaft, wherein the marker is positioned at a predetermined distance from the gage element along the elongated shaft; wherein the marker defines a marker width measured in a direction perpendicular to the elongated shaft that is at least equal to the size of the gage element; and
a handle, separate from the marker, at the second end of the elongated shaft.

9. The clearance gage of claim 8, wherein the gage element defines a cylindrical shape having a height and a diameter, wherein the diameter corresponds to the gage width, wherein the height is less than the diameter, and wherein the elongated shaft connects with the gage element orthogonal to the height of the cylindrical shape.

10. The clearance gage of claim 9, wherein the gage width is about 0.22 to about 0.26 inches and the height is less than about 0.2 inches.

11. The clearance gage of claim 10, wherein the gage width is about 0.233 inches.

12. The clearance gage of claim 10, wherein the height is less about 0.17 inches.

13. The clearance gage of claim 8, wherein the marker is positioned about 3 inches to about 4 away from a center of the gage element.

14. A method for assessing a clearance gap between two components of a gas turbine engine with the gas turbine engine off and without needing to disassemble the gas turbine engine, the method comprising:
  inserting a gage element of a clearance gage past a constriction point in the gas turbine engine that defines a first gap distance, wherein the clearance gage comprises:
    an elongated shaft having a first end and a second end; and
    the gage element connected to the first end of the elongated shaft, wherein the gage element defines a first width and a second width measured perpendicular to the elongated shaft, wherein the first width defines a size of the gage element and is greater than the first gap distance, wherein the second width is less than the first gap distance to allow the gage element to be inserted past the constriction point;
  rotating the clearance gage so that the first width of the gage element aligns with the clearance gap being evaluated; and
  advancing the clearance gage further into the gas turbine engine to determine whether the first width of the gage element can pass through the clearance gap.

15. The method of claim 14, wherein the clearance gage comprises, a marker connected to the elongated shaft, wherein the marker is positioned at a predetermined distance from the gage element along the elongated shaft; wherein the marker is sized to not allow the marker to be inserted past the first gap distance.

16. The method of claim 15, wherein advancing the clearance gage further into the gas turbine engine to determine whether the first width of the gage element can pass through the clearance gap comprises:
  advancing the clearance gage to allow the marker to contact a portion of the gas turbine engine adjacent to the constriction point, wherein the predetermined distance is set so that when the marker contacts the portion of the gas turbine engine adjacent to the constriction point, the gage element will have passed through the clearance gap.

17. The method of claim 14, wherein the two components of the gas turbine engine comprise a low pressure turbine wheel and a rear turbine bearing support; wherein the clearance gap corresponds to a second gap distance between a diaphragm of the rear turbine bearing support and an inner hub of the low pressure turbine wheel, and wherein the constriction point is formed by a separation between a flow path surface of the rear turbine bearing support and a turbine blade of the low pressure turbine wheel.

18. The method of claim 14, wherein the gage element defines a cylindrical shape, with the first width corresponding to a diameter of the cylindrical shape and the second width corresponding to a height the cylindrical shape, and wherein the elongated shaft connects with the gage element orthogonal to the height of the cylindrical shape.

19. The method of claim 18, wherein the first width is about 0.22 to about 0.26 inches and the second width is less than about 0.2 inches.

* * * * *